(12) United States Patent
Ravindranath et al.

(10) Patent No.: US 7,194,541 B1
(45) Date of Patent: Mar. 20, 2007

(54) SERVICE SELECTION GATEWAY (SSG) ALLOWING ACCESS OF SAME SERVICES TO A GROUP OF HOSTS

(75) Inventors: Vinodh Kumar Ravindranath, Bangalore (IN); Amit S. Phadnis, Bangalore (IN)

(73) Assignee: Cisco Technology, Inc, San Jose, CA (US)

( * ) Notice: Subject to any disclaimer, the term of this patent is extended or adjusted under 35 U.S.C. 154(b) by 818 days.

(21) Appl. No.: 10/102,695

(22) Filed: Mar. 22, 2002

(51) Int. Cl.
*G06F 15/173* (2006.01)
(52) U.S. Cl. .......................................... 709/225; 726/2
(58) Field of Classification Search ......... 709/201–253
See application file for complete search history.

(56) References Cited

U.S. PATENT DOCUMENTS

| | | | | |
|---|---|---|---|---|
| 5,815,664 | A | * | 9/1998 | Asano ......................... 709/227 |
| 5,822,518 | A | * | 10/1998 | Ooki et al. ................. 713/201 |
| 5,832,228 | A | * | 11/1998 | Holden et al. .............. 709/225 |
| 5,835,726 | A | * | 11/1998 | Shwed et al. ............... 709/229 |
| 6,049,821 | A | * | 4/2000 | Theriault et al. ........... 709/203 |
| 6,199,099 | B1 | * | 3/2001 | Gershman et al. .......... 709/203 |
| 6,202,156 | B1 | * | 3/2001 | Kalajan ....................... 726/11 |
| 6,530,025 | B1 | * | 3/2003 | Nakagawa et al. ......... 713/201 |
| 7,016,956 | B2 | * | 3/2006 | Dobbins et al. ............ 709/224 |
| 2003/0174841 | A1 | * | 9/2003 | Nault et al. ................. 380/277 |
| 2006/0053290 | A1 | * | 3/2006 | Randle et al. .............. 713/169 |

OTHER PUBLICATIONS

Entitled:"Data Sheet: Cisco Service Selection Gateway", Published on: Oct. 7 21:07:17 PDT 2001; Available at: http://www.cisco.com/warp/public/cc/pd/as/6400/prodlit/ssgw_ds.htm (pp. 3).
Entitled:"Cisco Subscriber Edge Services Manager"; Published on: Dec. 14 14:18:38 PST 2001; Available at: http://www.cisco.com/warp/public/cc/pd/as/6400/prodlit/esvmn_ov.htm (pp. 9).
Entitled:"Node Route Processor—Service Selection Gateway Enhancements II"; Published on: Mar. 26 14:56:36 PST 2000; Available at: http://www.cisco.com/univercd/cc/td/doc/product/software/ios122/122newft/122limit/122b/122b_4/122b4_sg (pp. 17).
Entitled:"Service Selection Gateway"; Published on: Feb. 25 21:23:17 PST 2002;Available at: http://www.cisco.com/univercd/cc/td/doc/product/dsl_prod/6400/feat_gd/12_2_2/fg2_ssg.htm (pp. 82).
Rigney, et. al.; Entitled, "Request for Comments: 2865- Remote Authentication Dial In User Service (RADIUS)"; Jun. 2000; Available from www.letf.org (76 Pages).

* cited by examiner

*Primary Examiner*—Patrice Winder
*Assistant Examiner*—V. Korobov
(74) *Attorney, Agent, or Firm*—Narendra R Thappeta

(57) ABSTRACT

A service selection gateway (SSG) which enables a service provider to conveniently provide access of the same services to a group of hosts. The service provider may specify the specific services each group of hosts is permitted to access, and the SSG forwards packets from the hosts only to the corresponding specified services. In an embodiment implemented substantially in the form of software, the access information (specifying the server addresses which can be accessed from each group of hosts) is stored in the form of data structures in which the same copy of access information is shared by many (all) hosts in the corresponding group.

39 Claims, 6 Drawing Sheets

SERVICE SELECTION GATEWAY (SSG) ALLOWING ACCESS OF SAME SERVICES TO A GROUP OF HOSTS

RELATED APPLICATION

The present application is related to co-pending U.S. Patent Application Entitled, "Service Selection Gateway (SSG) Allowing Access to Services Operating Using Changing Set of Access Addresses", Filed: Mar. 4, 2002, Ser. No. 10/086,346, Inventors: RAVINDRANATH et al., and assigned to common assignee.

BACKGROUND OF THE INVENTION

1. Field of the Invention

The present invention relates to service selection gateways (SSG) used in telecommunication networks, and more specifically to a SSG which allows a group of hosts to access the same services conveniently.

2. Related Art

Service selection gateways (SSG) generally refer to network switches which allow a subscriber to selectively access various services on the Internet. In one common scenario, a service provider (e.g., an internet service provider or a shop providing the subscriber terminals to access the services) controls the services a subscriber is permitted to access, and charge (receive compensation) the subscriber for accessing/using the services.

In general, it is desirable that a SSG provide a service provider the ability to offer different services to different subscribers and charge the subscribers for the services. In addition, the SSG should generally simplify the manner in which the services can be enabled for the specific subscribers.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

An aspect of the present invention allows a service selection gateway (SSG) to efficiently provide the same services to a group of hosts. In one embodiment, the group of hosts are contained in the same network sharing the same network address. An administrator may specify the specific services the group of hosts is permitted to access, and the SSG allows each host in the group to access the permitted services. Thus, the service selection performed by a group representative is applied to all of the hosts in the group. As a result, the selection of services provided to the group may be simplified.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
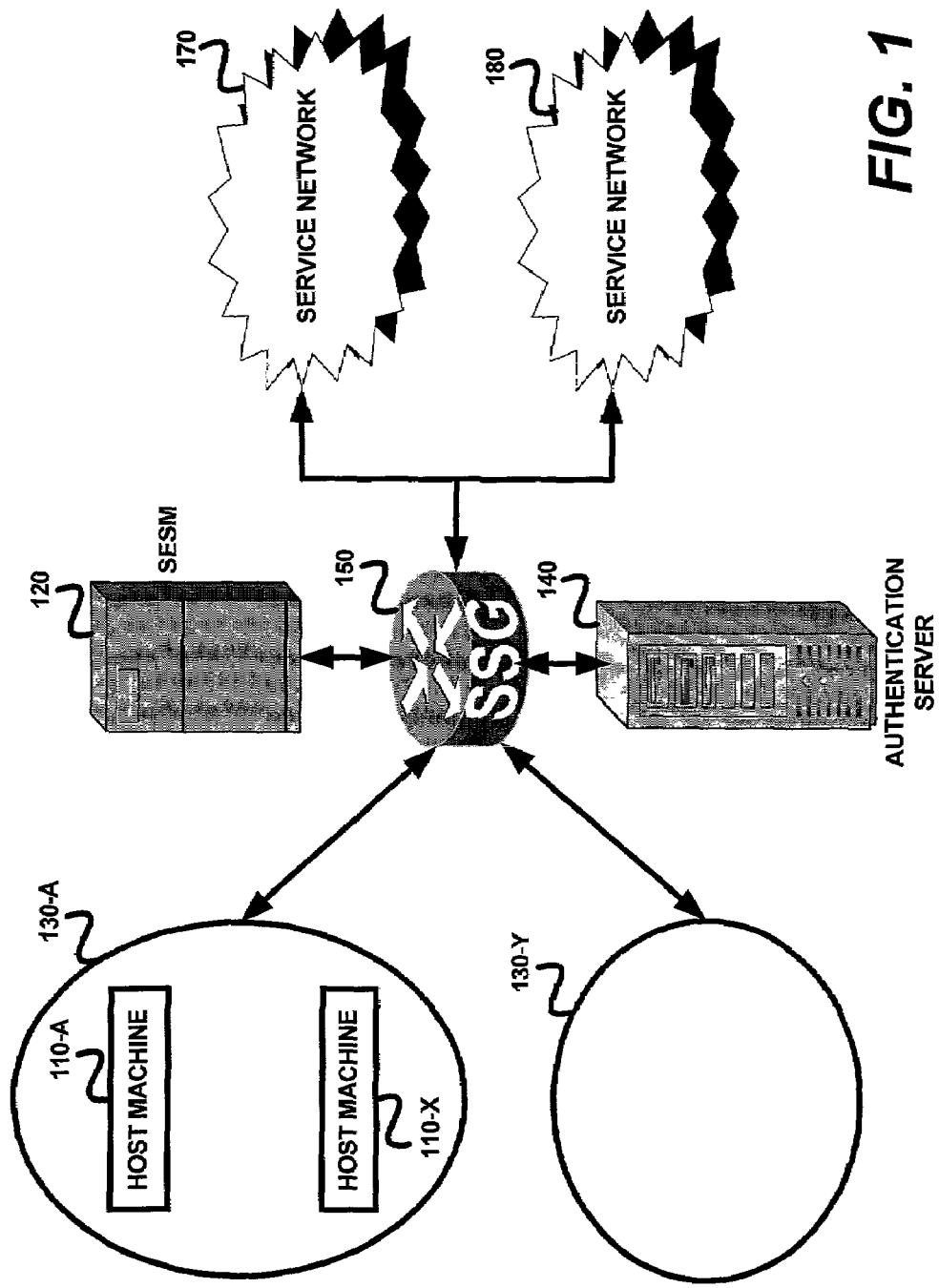
FIG. 1 is a block diagram illustrating an example environment in which the present invention can be implemented.

FIG. 1 is a block diagram illustrating an example environment in which the present invention can be implemented. The environment is shown containing host networks 130-A and 130-Y, subscriber edge service manager (SESM) 120, authentication server 140, service selection gateway (SSG) 150, and service networks 170 and 180. Each block is described in further detail below.

Host networks 130-A and 130-Y are described with reference to only host network 130-A for conciseness. However, the description is applicable to host network 130-Y as well. Host network 130-A is shown containing host machines 110-A through 110-X. In reality, a host network can contain potentially several thousands of machines.

Service networks 170 and 180 typically contain many servers (not shown) such as web servers and network devices (e.g., routers), which provide different services (e.g., gaming services, storage services). Subscribers access the services provided by service networks 170 and 180 using host machines 110-A through 110-X.

SESM 120 provides an interface (e.g., a web page) for a group administrator to send the necessary information (e.g., user identifier and password) for authentication. The provided information is sent to authentication server 140. Authentication server 140 verifies the information and authenticates the group administrator if the provided information is valid. Authentication server 140 may be implemented based on RFC-2865, entitled, "Remote Authentication Dial In User Service (RADIUS)", available from www.ietf.org, and is incorporated in its entirety herewith.

An authentication confirmation message from authentication server 140 may further indicate a list of services the group administrator may administer with respect to host network 130-A. SESM 120 may then enable the group administrator to select the desired services of interest for a group of subscribers by a suitable interface, for example, by sending a HTML page to a web browser executing on a machine (e.g., host machine 110-A) from which the administrator is accessing.

SSG 150 may be configured to forward packets (received from host machines 110-A through 110-X) related to the permitted (potentially the same as the desired) services only. While the embodiment are described substantially with reference to forwarding of packets in from hosts to the service networks, it should be understood that the concepts may be applicable to forwarding packets in the reverse direction as well. Thus, the configuration may specify the specific packets to be forwarded in both directions.

As SSG 150 forwards packets related to only the permitted services of the specific (group of) hosts, a group administrator may conveniently specify the specific services that a group of hosts can access, and users using the host machines may then access only the specified services. The operation of SSG 150 in supporting such a feature is described below in further detail.

3. Method

Figure 2:
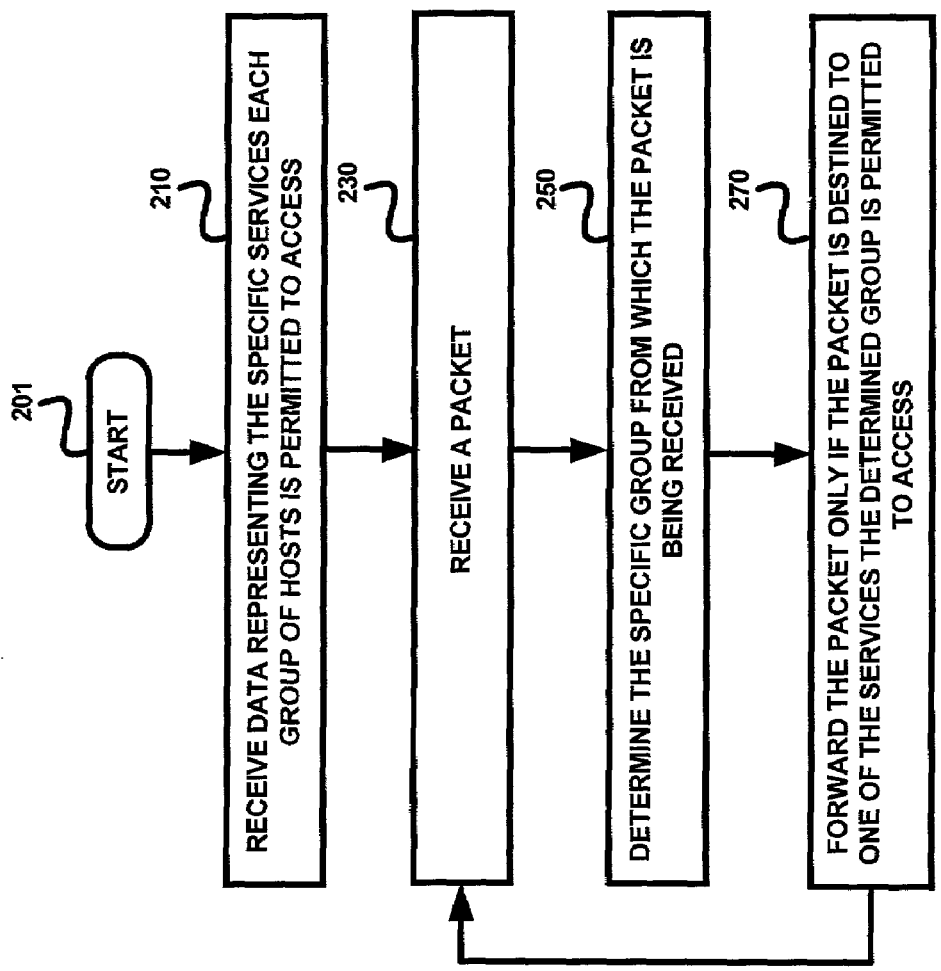
FIG. 2 is a flow chart illustrating a method in accordance with the present invention.

FIG. 2 is a flow-chart illustrating a method using which a service selection gateway may be implemented to provide the same set of services to a group of hosts. The flow-chart is described with reference to the systems of FIG. 1 for illustration. However, the invention can be implemented in other environments as well. The method begins in step 201, in which control immediately passes to step 210.

In step 210, SSG 150 may receive data representing the specific services each group of hosts is permitted to access. The data may be received according to any pre-specified convention. SSG 150 may store the data for usage with processing of packets. In step 230, SSG 150 may receive a packet from a host machine (e.g., 110-A).

In step 250, SSG 150 determines the specific group containing the host machine that has sent the packet. The determination generally entails among other tasks examination of a header of the received packet. An example approach for such determination is described in sections below.

In step 270, SSG 150 forwards the packet only if the determined group is permitted to access the service the packet is destined to reach. The destination address of the packet generally determines the service to which the packet is destined. Control then passes again to step 230, in which SSG 150 receives another packet. Steps 250 and 270 may be repeated for each received packet.

The above approach may be used by SSG 150 to allow a group of hosts to access specific services. However, it may be desirable to provide specific services for smaller groups (sub-group) of host machines within a network. For example, in a corporate environment, it may be desirable to provide one set of services to a finance department, another set of services to engineering department, and a potentially common set of services to both the departments. The manner in which access to such specific, yet differentiated services, may be provided to different sub-groups is described below with examples.

4. Differentiation by Sub-Groups

It is assumed for illustration that the network address corresponding to all host machines in host network 130-A equal 10.0.0.0 (network mask equals 255.0.0.0). All host machines in host network 130-A need to be provided access to services A and B. Sub-group 1 (of host network 130-A) has a network address of 10.20.0.0 (network mask 255.255.0.0) and need to be provided access to services C and D (in addition to the requirement of A and B for the entire network).

It is also assumed that sub-group 2 (within host network 130-A) has a network address of 10.30.0.0 (network mask 255.255.0.0) and needs to be provided access to services E and F in addition to A and B. A small group within sub-group 1 may have a network address of 10.20.20.0 (network mask equals 255.255.255.0) and may need to be provided access to service G in addition to the requirements (A, B, C and D) for sub-group 1 noted above.

It is further assumed that the first subgroup contains host machines 110-A (host address 10.20.20.5) and 110-B (10.20.30.10), the second sub-group contains host machines 110-C (10.30.30.9) and 110-D (10.30.20.5) (110-C and 110-D not shown in FIG. 1). Host machine 110-A may be contained in the small group noted above. The manner in which SSG 150 may allow different desired services to be provided to the two sub-groups and small group of host machines is described below.

SSG 150 may store access information indicating the above requirements, i.e., the services permitted for each group of hosts. Assuming that the (sub, small) group a host relates to, can be determined based on the host's IP address, the access information may be maintained using Table I below.

TABLE I

| Entry No | network addresses | network masks | Allowed Services |
|---|---|---|---|
| 1 | 10.0.0.0 | 255.0.0.0 | A and B |
| 2 | 10.20.0.0 | 255.255.0.0 | A, B, C and D |
| 3 | 10.30.0.0 | 255.255.0.0 | A, B, E and F |
| 4 | 10.20.20.0 | 255.255.255.0 | A, B, C, D, and G |

The manner in which received packets may be processed according to the requirements of Table I is described now with examples. In general, the most specific entry (also referred to as "longest pre-fix mach" approach in the relevant arts) matching the source address of a received packet may be used to determine the permitted services.

A packet may be forwarded if the destination address belongs to a service network providing a permitted service. For illustration it is assumed that the network addresses of servers providing services A and B respectively are 30.20.40.0 and 9.20.50.0 with a common mask of 255.255.255.0.

As a first example, suppose SSG 150 receives a packet with a source IP address of 10.10.2.1. and a destination address of 30.20.40.5. SSG 150 may compare the source IP address with the entries made in SSG 150. As the source IP address matches only the first entry, and the destination address matches an address of a server providing service A, the packet may be forwarded.

As another example, suppose SSG 150 receives a packet with source IP address 10.20.3.2. The source IP address in the above example matches both entries 1 and 2. Entry 2 with a longer pre-fix may be used to determine the permitted services (A, B, C and D). Thus, if the packet is destined for any of services A–D, the packet may be forwarded by SSG 150.

As a third example, suppose SSG 150 receives a packet with source IP address 10.20.20.8. The source IP address in the above example matches entries 1, 2 and 4 of Table I. Entry 4 with the longest pre-fix may be used to determine the permitted services. Thus, the packet may be forwarded by SSG 150 if the packet is destined to any of the services A–D and G. The description is continued with reference to the details of an example embodiment of SSG 150.

5. Service Selection Gateway

Figure 3:
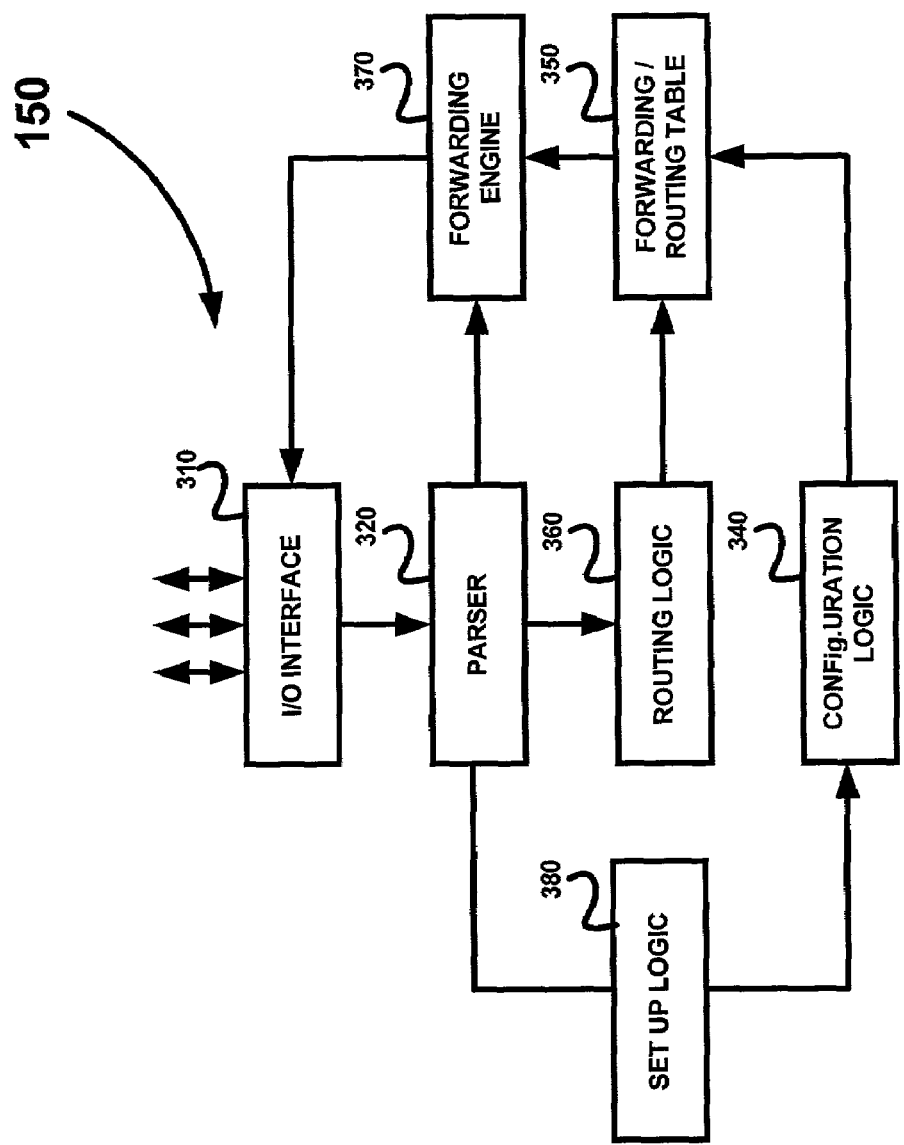
FIG. 3 is a block diagram illustrating the internals of an embodiment of a service selection gateway (SSG) provided in accordance with the present invention.

FIG. 3 is a block diagram illustrating the details of an embodiment of service selection gateway (SSG) 150 in accordance with an aspect of the present invention. SSG 150 is shown containing I/O interface 310, parser 320, configuration logic 340, forwarding/routing table 350, routing logic 360, forwarding engine 370 and set up logic 380. Each of the blocks is described in further detail below.

I/O interface 310 provides the physical, electrical and other protocol interfaces necessary for IP packets to be sent to and received from the other systems, i.e., host networks 130-A and 130-Y, service networks 170 and 180, authentication server 140, and SESM 120. The received packets are forwarded to parser 320 for further processing. I/O interface 310 may contain several physical ports which can be used to send packets on different paths. I/O interface 310 may be implemented in a known way.

Parser 320 examines each received packet to determine whether to forward the contained data (or the entire packet) to set up logic 380, routing logic 360 or forwarding engine 370. Routing related data may be sent to routing logic 360. IP packets requiring forwarding are sent to forwarding engine 370. Data related to access information may be sent to set up logic 380.

In one embodiment, parser 320 receives from SESM 120 packets indicating the services each group of hosts is permitted to access. Parser 320 forwards the corresponding data/packets to configuration logic 340. Parser 320 may receive next hop information for each service from SESM 120, and forwards the corresponding data/packets to routing logic 360. Alternatively, configuration logic 340 may be integrated with routing logic 360 as one block.

Forwarding/routing table 350 stores the routing and access information necessary to process the packets which need to be forwarded to a next hop. In general, routing information indicates the path in which the packet is to be forwarded, and the access information indicates whether to forward (or block) a packet according to the services the corresponding group (including sub-group and small group) is permitted to access.

Thus, forwarding/routing table 350 may store data indicating the specific services each group of hosts is permitted to access. The access information and routing information may be stored in the form of a single table or separate multiple tables as felt necessary by a designer consistent with the implementation of other blocks. Each row in the table may correspond to an entry as described in the earlier sections.

Routing logic 360 processes the routing information received from parser 310. The routing information is stored in forwarding/routing table 350. The routing information may be received from SESM 120 as noted above. Alternatively, routing logic 360 may be implemented consistent with any routing protocols. Routing logic 360 may be implemented in a known way.

Set up logic 380 receives packets/data representing a group of hosts (e.g., IP addresses) and the corresponding permitted services (e.g., URLs or other service identifiers). Set up logic 380 may then interface with authentication server 140 to retrieve the service profile of each of the permitted services. The profile of the permitted services may contain the IP address (or network address) of the corresponding service network. Set up logic 380 may then provide the service information containing the addresses of the group of hosts and the service network address to configuration logic.

Configuration logic 340 receives from set up logic 380 data representing access information and stores the received information in forwarding/routing table 350. In an embodiment, the access information is represented in the form of the range of addresses each group of hosts is permitted to access, and the services each groups is permitted to access.

Forwarding engine 370 determines the manner in which each packet received from parser 320 is processed. The routing information may be used to determine the specific port of I/O interface 310 on which to forward the packet. The access information may be used to determine which services to forward the packet. Forwarding/routing table 350 may be examined for the routing and access information.

In an embodiment, when packets are received from hosts, forwarding engine 370 determines the specific group (or host in the group) sending the packet (e.g., based on the source address of the packet), and forwards the packet only if the packet is destined to a service permitted access for the group. When packets are received from service networks, forwarding engine 370 determines the specific group of hosts to which the packet is destined to, and forward the packet only if the packet is received from a service network permitted access from the determined group.

It should be understood that the different components of a SSG can be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing SSG 150 with a desired mix of hardware, software and/or firmware. An embodiment implemented substantially in software is described below.

6. Software Implementation

Figure 4:
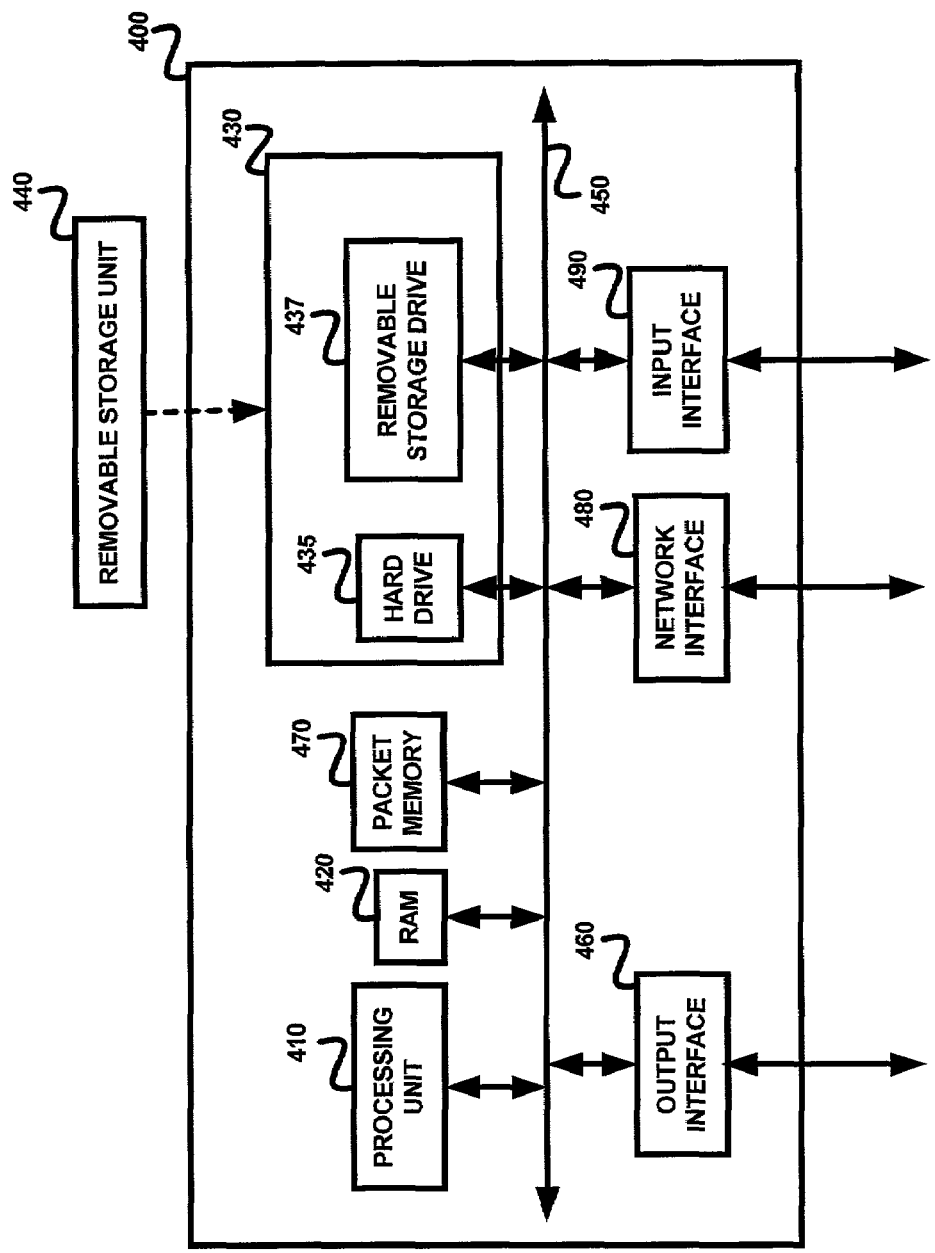
FIG. 4 is a block diagram illustrating the details of an embodiment of an service selection gateway implemented substantially in the form of software according to an aspect of the present invention.

FIG. 4 is a block diagram illustrating the details of system 400 in one embodiment. System 400 may correspond to SSG 150 as described below. System 400 is shown containing processing unit 410, random access memory (RAM) 420, storage 430, output interface 460, packet memory 470, network interface 480 and input interface 490. Each block is described in further detail below.

Output interface 460 provides output signals (e.g., display signals to a display unit, not shown) which can form the basis for a suitable subscriber interface for an administrator (configuring SSG 150) to interact with SSG 150. Input interface 490 (e.g., interface with a key-board and/or mouse, not shown) enables a user/administrator to provide any necessary inputs to SSG 150.

Network interface 480 may enable SSG 150 to send and receive data on communication networks using internet protocol (IP). Network interface 480, output interface 460 and input interface 490 may generally be referred to as interfaces, and can be implemented in a known way.

RAM 420, storage 430, and packet memory 470 may together be referred to as a memory. In general, memory contains storage elements (including components such as registers which can store data). RAM 420 receives instructions and data on path 450 from storage 430, and provides the instructions to processing unit 410 for execution. Packet memory 470 stores (queues) packets waiting to be forwarded (or otherwise processed) on different ports.

Secondary memory 430 may contain units such as hard drive 435 and removable storage drive 437. Secondary storage 430 may store the software instructions and data, which enable SSG 150 to provide several features in accordance with the present invention. While secondary memory 430 is shown contained within SSG 150, an alternative embodiment may be implemented with the secondary memory implemented external to SSG 150, and the software instructions (described below) may be provided using network interface 480.

Some or all of the data and instructions may be provided on removable storage unit 440 (or from a network using protocols such as Internet Protocol), and the data and instructions may be read and provided by removable storage drive 437 to processing unit 410. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420.

In general processing unit 410 reads sequences of instructions from various types of memory medium (including RAM 420, storage 430 and removable storage unit 440), and executes the instructions to provide various features of the present invention. The access information related to the hosts may be maintained in the form of data structures. Example data structures are described below.

7. Access Information

Figure 5:
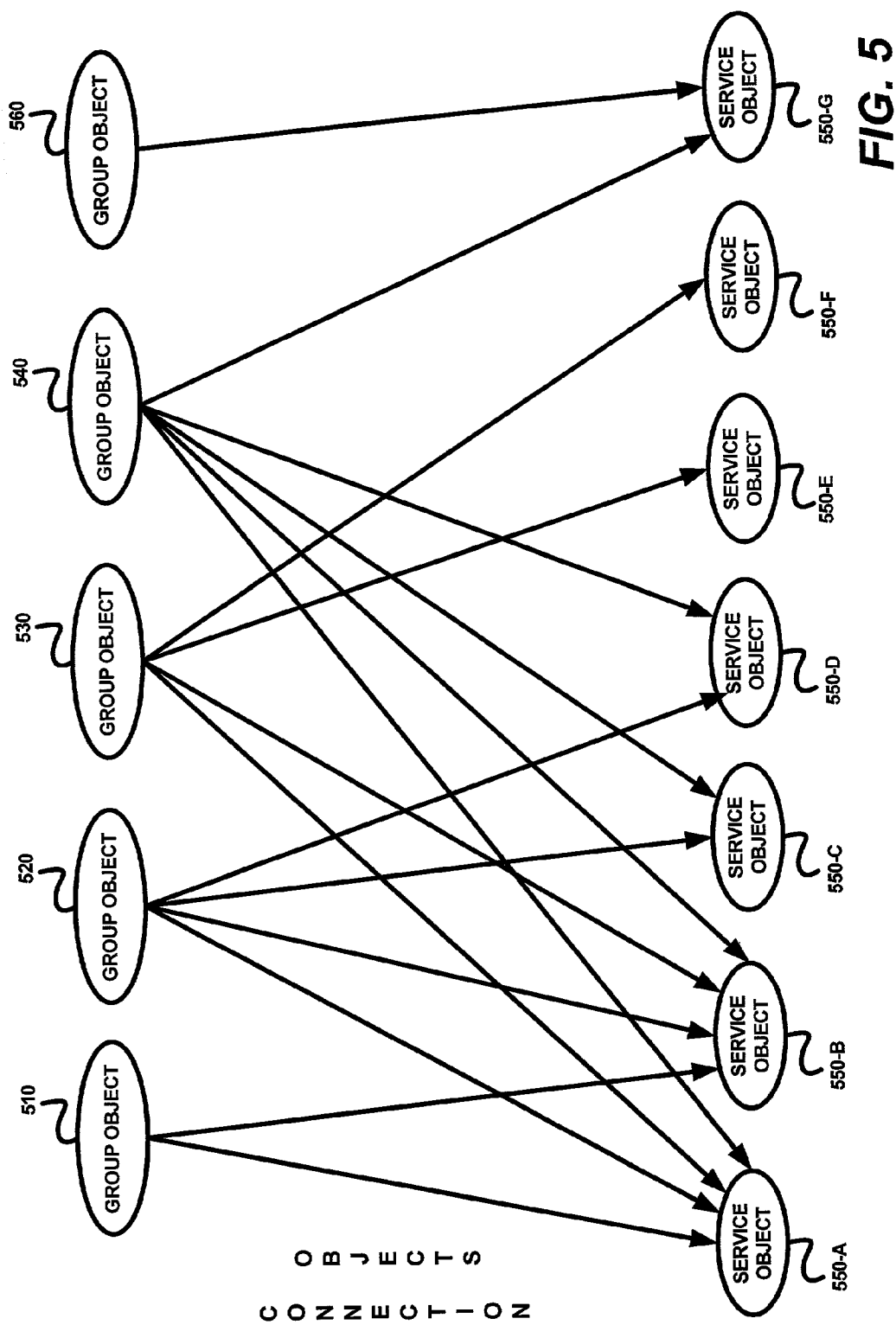
FIG. 5 is a block diagram illustrating the manner in which objects identifying different groups may be connected to the corresponding service objects.

FIG. 5 is a diagram depicting the different data structures created in an embodiment in relation to the example of Table 1 described above. In an embodiment, a group object data structure is created for each group (including sub-group and small groups) which requires a specific set of services.

In the example described above with reference to Table 1, four group object data structures (shown as 510, 520, 530 and 540 in FIG. 5) may be created for the four entries. Each group object data structure may specify a corresponding range of host addresses to which the data structure relates to. Thus, group object data structure 510 may specify a network address of 10.0.0.0 associated with a mask of 255.0.0.0, data structure 520 may specify a network address of 10.20.0.0 associated with a mask of 255.255.0.0, data structure 530 may specify a network address of 10.30.0.0 associated with a mask of 255.255.0.0, and data structure 540 may specify a network address of 10.20.20.0 associated with a mask of 255.255.255.0.

An aspect of the present invention enables even a single host to have a specific set of access requirements even though multiple hosts are described as having common requirements. Thus, assuming a single host needs to access only one service, a group object (shown as 560) may be created for the single host. Group object data structure 560 may contain a single address also.

In general, each group object may contain any list of host addresses, which are potentially non-contiguous and cannot be represented by a network address and an associated mask. The examination of group object data structures generally needs to be consistent with the type (list in the form of single addresses, or a network address and mask combination) of representation of the host addresses.

A service object may be created associated with each of the services provided through SSG 150. SSG 150 may store a number of service objects (7 in the example of Table 1) equal to the number of services accessed by the groups at a given time. Thus, FIG. 5 is shown containing 7 service objects represented by 550-A through 550-G for the seven services A–G noted in Table 1 above. Each service object may store the address (or a range of addresses using an appropriate network mask) of the server(s) providing the corresponding service.

Connection objects may be used to specify the specific services each group of hosts is permitted to access. In FIG. 5, each connection object is represented by an arrow connecting the group object to the corresponding service object.

Thus, with reference to the example of Table 1, group object 510 (of entry 1 in Table 1) is shown connected to service objects 550-A and 550-B.

Similarly, group object 520 (of entry 2) may be connected to service objects 550-A through 550-D, group object 530 (of entry 3) may be connected to service objects 550-A, 550-D, 550-E and 550-F, and group object 540 may be connected to service objects 550-A through 550-D and 550-G. In addition to indicating the service permitted for a host group, the connection object may store information such as usage statistics (time the service is used or packets transmitted/received).

While the subgroups (and small groups) are described as requiring more services than the corresponding (bigger) groups, it should be appreciated that the subgroups can have entirely different set of service access requirements. For example, small group noted above may merely need access to A, B, and G, in which case the connection objects would connect group object 540 to service objects 550-A, 550-B and 550-G.

Thus, the instructions executed by processing unit 410 may cause the data structures noted above to be created and stored (in forwarding/routing table 350 of FIG. 3) as soon as a group administrator specifies the services for the difference groups of hosts. Once the data structures are created and stored, SSG 150 may be ready to forward the packets to provide the permitted services to each group as described below.

While forwarding packets, the instructions executed by processing unit 410 may cause each packet to be identified with one of the group objects. In the example approach described with reference to Table 1, the source (destination address in the reverse direction) address of the packet may be examined to determine the appropriate group object (data structure) which is to be used in determining whether to forward the packet. The host object matching with longest matching pre-fix may be chosen as noted above.

Once the group object is determined, the destination (source in the reverse direction) addresses which are permitted access for the corresponding host group may be determined by the service objects connected to the determined host object by the corresponding connection objects. Thus, a packet may be forwarded if the destination address of the packet is contained in the addresses specified by any of the connected service objects. On the other hand, if the group object is not present for a group containing the host or if the access (destination) address is not present in the service objects, the packet may be dropped.

Thus, SSG 150 may enable a service provider to conveniently provide the same set of services to a group of hosts (and thus the subscribers using the hosts). In general, the embodiments of SSG 150 above need to operate while the task of a group administrator is simplified. Such a simplification may be attained by using SESM 120. The operation of an embodiment of SESM 120 is described in further detail below with reference to FIG. 6.

8. Subscriber Edge Service Manager (SESM)

Figure 6:
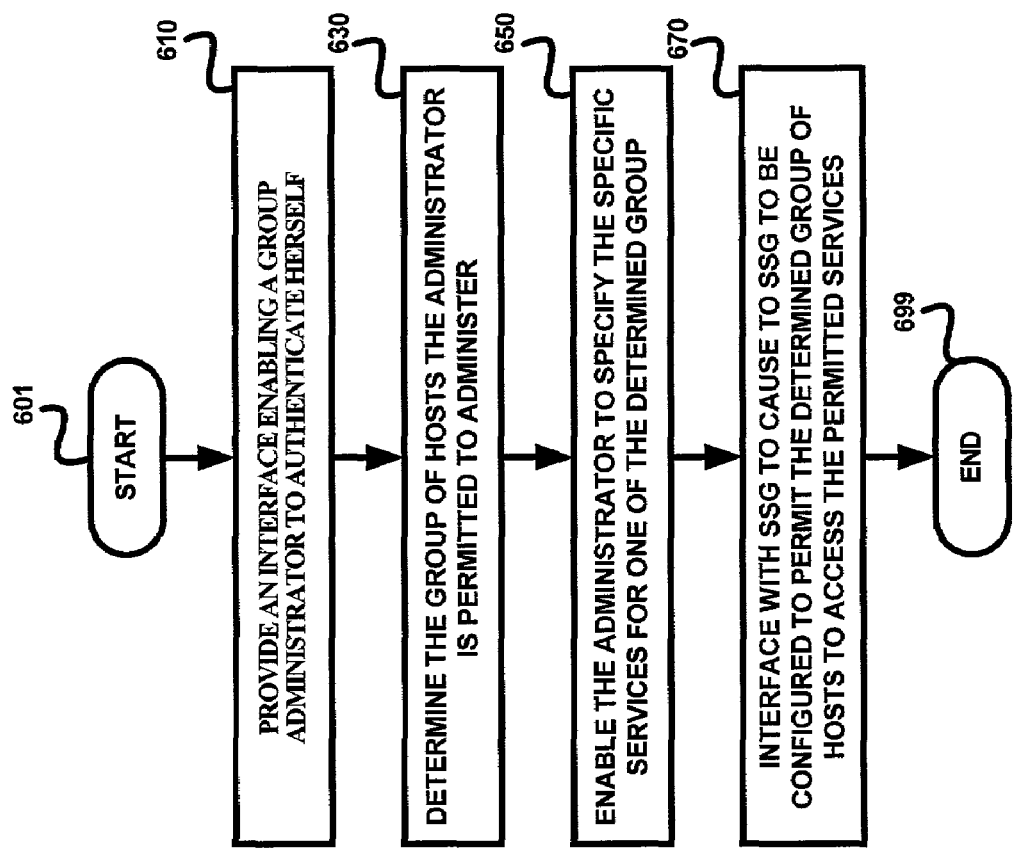
FIG. 6 is a flow chart illustrating the details of operation of an embodiment of a subscriber edge service manager (SESM) according to an aspect of the present invention.

FIG. 6 is a flowchart illustrating the operation of an embodiment of SESM 120 in accordance with an aspect of the present invention. The method begins in step 601, in which control immediately passes to step 610.

In step 610, SESM 120 may provide an interface to enable a group administrator to authenticate herself/himself. Several approaches can be used for such authentication as is well known in the relevant arts. In an embodiment, SESM 120 provides a web page (sent and received using IP packets) using which a group administrator may provide a user identification and password. SESM 120 may interface with authentication server 140 to authenticate the administrator.

In step 630, SESM 120 may determine the groups of hosts the authenticated administrator is permitted to administer. The corresponding information may be retrieved from authentication server 140. In an embodiment, authentication server 140 and SESM 120 are implemented in one data processing system (e.g., computer server system).

In step 650, SESM 120 enables the administrator to specify the specific permitted services for one of the determined group of hosts. The administrator may thus specify the services a group of hosts is permitted to access. In an embodiment, the group of services are indicated by easily understandable labels (e.g., URLs or names reflecting the services).

In step 670, SESM 120 interfaces with SSG 150 (and possibly authentication server 140) to cause SSG 150 to be configured to permit the determined group of hosts to access the permitted services. In the embodiments described above, SESM 120 is described as sending to SSG 150 data representing the permitted services for a group of hosts, and SSG 150 is described as interfacing with authentication server 140 to retrieve a service profile containing the service network address(es).

An alternative embodiment may be implemented in which SESM 120 retrieves the service network addresses, and provide the host group addresses and the service network addresses to SSG 120. SSG 120 may interface directly with authentication server 140 to retrieve the service network addresses. The implementation of such an embodiment will be apparent to one skilled in the relevant arts based on the disclosure provided herein.

An embodiment of SESM 120 is implemented substantially in the form of software. The embodiment is described using system 400 as a reference, and only the differences from the previous section (6. Software Implementation) are noted in this section for conciseness.

A combination of the three interfaces (460, 480, and 490) may enable a group administrator to authenticate and specify the specific service networks a group of hosts are permitted to access. Network interface 480 may be used to interface with SSG 150 and authentication server 140. The software instructions provided in a computer readable medium (e.g., secondary storage provided within or outside of system 400) may be executed to provide various features in accordance with the present invention.

Thus, the present invention enables a group administrator to conveniently control a set of services a group of hosts are permitted to access.

9. CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of enabling a plurality of hosts to access a plurality of services provided by corresponding plurality of servers at corresponding destination addresses, said method being implemented in a service selection gateway (SSG) operating as a switch, said plurality of hosts and said plurality of servers being separated by a network, said SSG providing connectivity between said plurality of hosts and said servers via said network, said method comprising:

receiving data representing a corresponding subset of services each of said plurality of hosts is permitted to access, said data indicating that a first host is permitted to access a first subset of services, each of said subset of services being contained in said plurality of services and said first host being contained in said plurality of hosts;

receiving a packet from said first host contained in said plurality of hosts, said packet containing a destination address identifying a service sought to be accessed;

determining whether said packet is destined to one of said first subset of services by examining said destination address; and forwarding said packet on said network to a server providing said one of said subset of services if said packet is destined to one of said first subset of services, said server being contained in said plurality of servers, wherein said SSG is physically separate from said plurality of servers.

2. The method of claim 1, further comprising storing said data representing said subset of services in a memory in the form of access information which is examined by said determining.

3. The method of claim 2, wherein said access information comprises a group data structure containing a plurality of addresses identifying said plurality of hosts, a plurality of service data structures with each of said plurality of service data structure containing addresses of servers providing a corresponding service, and a plurality of connection data structures indicating that said plurality of hosts identified by said group data structure are permitted to access said subset of services, wherein said determining comprises:

making a determination whether a source address of said packet is contained in said plurality of addresses of said group data structure;

using said plurality of connection data structures to determine said plurality of service data structures; and examining said plurality of service data structures to determine whether said destination address is contained in said plurality of service data structures.

4. The method of claim 3, wherein said plurality of hosts comprises a subgroup of hosts requiring access to a different set of services than said plurality of hosts, wherein said method further comprises:

maintaining another group data structure for said subgroup, wherein said another group data structure stores data representing a plurality of addresses identifying said subgroup of hosts, wherein said making comprises determining one of said another group data structure and said group data structure according to a longest matching prefix.

5. The method of claim 1, further comprising retrieving a service network address in response to said receiving data, wherein said service network address corresponds to a service network providing one of said subset of network services.

6. The method of claim 1, further comprises:

receiving another packet from a first service network providing a service;

determining whether said another packet is destined to one of said plurality of hosts; and forwarding said another packet only if said another packet is destined to one of said plurality of hosts.

7. The method of claim 6, wherein each of said packet and said another packet comprises an IP packet.

8. A method of enabling a group administrator to control services accessed by a plurality of hosts, said services being provided by corresponding plurality of servers at corresponding destination addresses, said plurality of hosts and said plurality of servers being separated by a network, said method being performed in a subscriber edge service manager, said method comprising:
receiving from said group administrator data representing a corresponding subset of services each of said plurality of hosts is permitted to access; and
in response to said receiving, causing a service selection gateway (SSG) to be configured to permit each of said plurality of hosts to access said corresponding subset of services, wherein said subset of services are comprised in a plurality of services accessible using said SSG, and wherein said SSG operates as a switch and provides connectivity between said plurality of hosts and said servers via a network and wherein said SSG is physically separate from said plurality of servers,
and wherein said SSG is physically separate from said plurality of servers.

9. The method of claim 8, further comprising:
enabling authentication of said group administrator; and
enabling said group administrator to specify said corresponding subset of services associated with each of said plurality of hosts.

10. The method of claim 9, wherein said enabling authentication comprises interfacing with an authentication server.

11. The method of claim 9, wherein said enabling said group administrator comprises receiving a web page containing authentication information from said group administrator.

12. A service selection gateway (SSG) enabling a plurality of hosts to access a plurality of services provided by corresponding plurality of servers at corresponding destination addresses, said SSG operating as a switch, said plurality of hosts and said plurality of servers being separated by a network, said SSG providing connectivity between said plurality of hosts and said servers via said network, said SSG comprising:
means for receiving data representing a corresponding subset of services each of said plurality of hosts is permitted to access, said data indicating that a first host is permitted to access a first subset of services, each of said subset of services being contained in said plurality of services and said first host being contained in said plurality of hosts;
means for receiving a packet from said first host contained in said plurality of hosts, said packet containing a destination address identifying a service sought to be accessed;
means for determining whether said packet is destined to one of said first subset of services by examining said destination address; and
means for forwarding said packet on said network to a server providing said one of said subset of services if said packet is destined to one of said first subset of services, said server being contained in said plurality of servers,
wherein said SSG is physically separate from said plurality of servers.

13. The SSG of claim 12, further comprising:
means for retrieving a service network address in response to receiving said data, wherein said service network address corresponds to a service network providing one of said subset of network services; and
means for storing said data representing said subset of services in a memory in the form of a access information which is examined by said means for determining.

14. The SSG of claim 13, wherein said access information comprises a group data structure containing a plurality of addresses identifying said plurality of hosts, a plurality of service data structures with each of said plurality of service data structure containing addresses of servers providing a corresponding service, and a plurality of connection data structures indicating that said plurality of hosts identified by said group data structure are permitted to access said subset of services, wherein said means for determining comprises:
means for making a determination whether a source address of said packet is contained in said plurality of addresses of said group data structure;
means for using said plurality of connection data structures to determine said plurality of service data structures; and
means for examining said plurality of service data structures to determine whether said destination address is in contained in said plurality of service data structures.

15. The SSG of claim 14, wherein said plurality of hosts comprises a subgroup of hosts requiring access to a different set of services than said plurality of hosts, wherein said SSG further comprises:
means for maintaining another group data structure for said subgroup, wherein said another group data structure stores data representing a plurality of addresses identifying said subgroup of hosts, wherein said means for making determines one of said another group data structure and said group data structure according to a longest matching prefix.

16. The SSG of claim 12, further comprises:
means for receiving another packet from a first service network providing a service;
means for determining whether said another packet is destined to one of said plurality of hosts; and
means for forwarding said another packet only if said another packet is destined to one of said plurality of hosts.

17. A service selection gateway (SSG) enabling a group administrator to control services accessed by a plurality of hosts, said services being provided by corresponding plurality of servers at corresponding destination addresses, said plurality of hosts and said plurality of servers being separated by a network, said SSG comprising:
means for receiving from said group administrator data representing a corresponding subset of services each of said plurality of hosts is permitted to access; and
means for causing a service selection gateway (SSG) to be configured to permit each of said plurality of hosts to access said corresponding subset of services in response to receiving said data, wherein said subset of services are comprised in a plurality of services accessible using said SSG, and wherein said SSG operates as a switch and provides connectivity between said plurality of hosts and said servers via a network and wherein said SSG is physically separate from said plurality of servers.

18. The SSG of claim 17, further comprising:
means for enabling authentication of said group administrator; and
means for enabling said group administrator to specify said subset of services associated with said plurality of hosts.

19. The SSG of claim 18, wherein said means for enabling authentication interfaces with an authentication server to authenticate said group administrator.

20. The SSG of claim 18, wherein said means for enabling said group administrator receives a web page containing authentication information from said group administrator.

21. The SSG of claim 18, wherein said means for receiving receives said data in the form of IP packets.

22. A computer readable medium carrying one or more sequences of instructions for causing a subscriber edge service manager (SESM) to enable a group administrator to control services accessed by a plurality of hosts, said services being provided by corresponding plurality of servers at corresponding destination addresses, said plurality of hosts and said plurality of servers being separated by a network wherein execution of said one or more sequences of instructions by one or more processors contained in said SESM causes said one or more processors to perform the actions of:

receiving from said group administrator data representing a corresponding subset of services each of said plurality of hosts is permitted to access, said data indicating that a first host is permitted to access a first subset of services; and in response to said receiving, causing a service selection gateway (SSG) to be configured to permit each of said plurality of hosts to access said corresponding subset of services, wherein said subset of services are comprised in a plurality of services accessible using said SSG, and wherein said SSG operates as a switch and provides connectivity between said plurality of hosts and said servers via a network and wherein said SSG is physically separate from said plurality of servers, and wherein said SSG is physically separate from said plurality of servers.

23. The computer readable medium of claim 22, further comprising:

enabling authentication of said group administrator; and
enabling said group administrator to specify said subset of services associated with said plurality of hosts.

24. The computer readable medium of claim 23, wherein said enabling authentication comprises interfacing with an authentication server.

25. The computer readable medium of claim 23, wherein said enabling said group administrator comprises receiving a web page containing authentication information from said group administrator.

26. A service selection gateway (SSG) enabling a plurality of hosts to access a plurality of services provided by corresponding plurality of servers at corresponding destination addresses, said SSG operating as a switch, said plurality of hosts and said plurality of servers being separated by a network, said SSG operating as a switch to provide connectivity between said plurality of hosts and said servers via said network, said SSG comprising:

an interface receiving data representing a corresponding subset of services each of said plurality of hosts is permitted to access, said data indicating that a first host is permitted to access a first subset of services, each of said subset of services being contained in said plurality of services, said interface then receiving a packet from said first host; and a forwarding logic forwarding said packet on said network if said packet is destined to one of said first subset of services, wherein said forwarding logic and said interface are physically separate from said plurality of servers.

27. The SSG of claim 26, further comprising:

a memory;

a set up logic coupled to said interface, said set up logic examining said data and determining a service network address of each of said subset of services, said set up logic further receiving a plurality of host addresses of said plurality of hosts; and a configuration logic receiving said service network address and said plurality of host addresses, said configuration logic storing said service network address associated with said plurality of host addresses in said memory, wherein said forwarding logic determines whether said packet is destined to one of said subset of services by examining said memory.

28. The SSG of claim 27, wherein said interface comprises an input/output interface.

29. The SSG of claim 27, wherein said forwarding logic examines a destination address contained in said packet to determine whether said destination address corresponds to an address of a server providing one of said subset of services.

30. The SSG of claim 29, wherein said configuration logic stores said data representing said subset of services in said memory in the form of a access information which is examined by said forwarding logic.

31. The SSG of claim 30, wherein said access information comprises a group data structure containing a plurality of addresses identifying said plurality of hosts, a plurality of service data structures with each of said plurality of service data structure containing addresses of servers providing a corresponding service, and a plurality of connection data structures indicating that said plurality of hosts identified by said group data structure are permitted to access said subset of services, wherein said forwarding logic determines whether a source address of said packet is contained in said plurality of addresses of said group data structure, uses said plurality of connection data structures to determine said plurality of service data structures, and examines said plurality of service data structures to determine whether said destination address is contained in said plurality of service data structures.

32. The SSG of claim 31, wherein said plurality of hosts comprises a subgroup of hosts requiring access to a different set of services than said plurality of hosts, wherein said configuration logic maintains another group data structure for said subgroup, wherein said another group data structure stores data representing a plurality of addresses identifying said subgroup of hosts, wherein said forwarding logic determines one of said another group data structure and said group data structure according to a longest matching prefix.

33. The SSG of claim 31, wherein said packet comprises an internet protocol (IP) packet.

34. A computer readable medium carrying one or more sequences of instructions for causing a service selection gateway (SSG) to enable a plurality of hosts to access a plurality of services, said plurality of services being provided by corresponding plurality of servers at corresponding destination addresses, said SSG operating as a switch, said plurality of hosts and said plurality of servers being separated by a network, said SSG providing connectivity between said plurality of hosts and said servers via said network, wherein execution of said one or more sequences of instructions by one or more processors contained in said SSG causes said one or more processors to perform the actions of:

receiving data representing a corresponding subset of services each of said plurality of hosts is permitted to access, said data indicating that a first host is permitted to access a first subset of services, each of said subset of services being contained in said plurality of services and said first host being contained in said plurality of hosts;

receiving a packet from said first host contained in said plurality of hosts, said packet containing a destination address identifying a service sought to be accessed;

determining whether said packet is destined to one of said first subset of services by examining said destination address; and forwarding said packet on said network to a server providing said one of said subset of services if said packet is destined to one of said first subset of services, said server being contained in said plurality of servers, wherein said SSG is physically separate from said plurality of servers.

35. The computer readable medium of claim 33, further comprising storing said data representing said subset of services in a memory in the form of an access information which is examined by said determining.

36. The computer readable medium of claim 35, wherein said access information comprises a group data structure containing a plurality of addresses identifying said plurality of hosts, a plurality of service data structures with each of said plurality of service data structure containing addresses of servers providing a corresponding service, and a plurality of connection data structures indicating that said plurality of hosts identified by said group data structure are permitted to access said subset of services, wherein said determining comprises:

making a determination whether a source address of said packet is contained in said plurality of addresses of said group data structure;

using said plurality of connection data structures to determine said plurality of service data structures; and examining said plurality of service data structures to determine whether said destination address is contained in said plurality of service data structures.

37. The computer readable medium of claim 36, wherein said plurality of hosts comprises a subgroup of hosts requiring access to a different set of services than said plurality of hosts, wherein said computer readable medium further comprises:

maintaining another group data structure for said subgroup, wherein said another group data structure stores data representing a plurality of addresses identifying said subgroup of hosts, wherein said making comprises determining one of said another group data structure and said group data structure according to a longest matching prefix.

38. The computer readable medium of claim 36, further comprising retrieving a service network address in response to said receiving data, wherein said service network address is of a service network providing one of said subset of network services.

39. The computer readable medium of claim 34, further comprises:

receiving another packet from a first service network providing a service;

determining whether said another packet is destined to one of said plurality of hosts; and forwarding said another packet only if said another packet is destined to one of said plurality of hosts.

* * * * *

UNITED STATES PATENT AND TRADEMARK OFFICE
CERTIFICATE OF CORRECTION

PATENT NO. : 7,194,541 B1
APPLICATION NO. : 10/102695
DATED : March 20, 2007
INVENTOR(S) : Vinodh Kumar Ravindranath et al.

It is certified that error appears in the above-identified patent and that said Letters Patent is hereby corrected as shown below:

Col. 12, Line 22, replace "address is in" with --address is--.

Col. 15, Line 20, replace "claim 33" with --claim 34--.

Signed and Sealed this

Fifth Day of June, 2007

JON W. DUDAS
*Director of the United States Patent and Trademark Office*